(12) United States Patent
Weersink

(10) Patent No.: US 11,052,000 B2
(45) Date of Patent: Jul. 6, 2021

(54) VEHICLE, SUCH AS A CAR, CAMPER OR VAN, AND CARRIER WITH DRIVE MEANS

(71) Applicant: Rene Tarcisius Wiro Weersink, Enschede (NL)

(72) Inventor: Rene Tarcisius Wiro Weersink, Enschede (NL)

(*) Notice: Subject to any disclaimer, the term of this patent is extended or adjusted under 35 U.S.C. 154(b) by 0 days.

(21) Appl. No.: 16/087,755

(22) PCT Filed: Mar. 24, 2017

(86) PCT No.: PCT/NL2017/050188
§ 371 (c)(1),
(2) Date: Sep. 24, 2018

(87) PCT Pub. No.: WO2017/164744
PCT Pub. Date: Sep. 28, 2017

(65) Prior Publication Data
US 2019/0209403 A1    Jul. 11, 2019

(30) Foreign Application Priority Data
Mar. 24, 2016   (NL) .................................. 2016490

(51) Int. Cl.
*A61G 3/06*    (2006.01)
*A61G 3/02*    (2006.01)
*B60N 2/005*   (2006.01)
*B60N 2/24*    (2006.01)

(52) U.S. Cl.
CPC ............. *A61G 3/062* (2013.01); *A61G 3/02* (2013.01); *B60N 2/005* (2013.01); *B60N 2/245* (2013.01)

(58) Field of Classification Search
CPC ........ B60N 2/245; B60N 2/3043; A61G 3/062; A61G 3/02
USPC .................... 296/65.04, 65.11, 65.12, 63
See application file for complete search history.

(56) References Cited

U.S. PATENT DOCUMENTS

| 3,984,014 | A | * | 10/1976 | Pohl ..................... B60P 1/4442 414/546 |
|---|---|---|---|---|
| 4,306,634 | A | | 12/1981 | Sangster |
| 4,476,959 | A | * | 10/1984 | Tortellier .............. B60P 1/4442 414/546 |
| 5,040,832 | A | | 8/1991 | Zalewski |
| 5,147,104 | A | * | 9/1992 | Zalewski .............. B60N 2/245 296/65.12 |
| 5,207,549 | A | | 5/1993 | Riva |
| 6,283,528 | B1 | | 9/2001 | Townsend |
| 6,739,642 | B1 | * | 5/2004 | Egan ................... B60N 2/245 296/63 |

(Continued)

FOREIGN PATENT DOCUMENTS

WO       2015030608 A1    3/2015

*Primary Examiner* — Jason S Morrow
(74) *Attorney, Agent, or Firm* — The Webb Law Firm

(57) ABSTRACT

A vehicle, such as a car, camper or van including a seat, is mounted in the vehicle, with a seat surface; and a carrier arranged close to the seat and mounted in the vehicle, and provided with a drive for adjusting the carrier between a first position, in which an edge of the carrier runs parallel to the main direction of travel of the vehicle and lies in line with and adjoins the seat surface of the seat, and a second position in which, relative to the first position, this edge of the carrier is arranged at a distance from the seat surface in a direction transversely of the seat surface. The invention further relates to a carrier with a drive.

12 Claims, 3 Drawing Sheets

(56) References Cited

U.S. PATENT DOCUMENTS

| | | | |
|---|---|---|---|
| 7,543,876 B1 | 6/2009 | Egan | |
| 2012/0091772 A1* | 4/2012 | Egan | B60N 2/0232 297/344.13 |
| 2016/0121759 A1* | 5/2016 | Lee | B60N 2/0232 297/217.2 |

* cited by examiner

VEHICLE, SUCH AS A CAR, CAMPER OR VAN, AND CARRIER WITH DRIVE MEANS

CROSS-REFERENCE TO RELATED APPLICATIONS

This application is the United States national phase of International Application No. PCT/NL2017/050188 filed Mar. 24, 2017, and claims priority to Netherlands Patent Application No. 2016490 filed Mar. 24, 2016, the disclosures of which are hereby incorporated in their entirety by reference.

BACKGROUND OF THE INVENTION

Field of the Invention

The invention relates to a vehicle such as a car, camper or van.

Description of Related Art

Such vehicles are known in various forms and are for instance used for transporting persons and/or goods. When the user of the vehicle, i.e. a passenger or the driver, has a limited mobility, it can be difficult for the user to enter the vehicle. This problem occurs particularly in vehicles with a raised entrance, wherein the seat surface of the seat in the vehicle lies higher than the seat part of an aid such as a wheelchair used to reach the vehicle.

In order to solve this problem it is known to customize a vehicle when the driver of the vehicle has for instance a limited mobility, wherein the driver's seat is mounted on the floor of the vehicle such that this seat can rotate around an axis transversely of the floor. The driver can here enter the vehicle via the loading space on the rear side of the vehicle, for instance via a sloping path or ramp, then rotate the seat with the backrest toward the door opening in the side of the vehicle, take up position on the seat part and rotate the seat back to the starting position. Giving the seat a rotatable form already has drawbacks per se. Taking up position behind the steering wheel in this way takes a lot of time and a lot of effort. In addition, providing access via the rear side has the result that this space cannot be used, or can be used only in inefficient manner, for other purposes, such as transporting goods or passengers other than the driver, whereby a configuration as camper is also practically impossible. For safety purposes it is moreover desirable for the seat and the seatbelt fastenings arranged adjacently of the seat to be mounted as far as possible on the original (non-customized) configuration which was tested by the manufacturer. In most cases, the seat and the seatbelt anchoring point will however have to be modified during the customization. It is thus necessary, among other things, to modify the box, in which electronic components are often arranged. These components are often wired with rigid cable bundles. All in all, the necessity for customization makes the construction more complex and expensive.

The rotatable form usually also results in further modifications having to be made. The parking brake is usually positioned such that the legs are unable to pass it during rotation of the seat. It will often also be desirable for a manual control of brake pedal and gas pedal to be incorporated in the vehicle. Such a manual control is generally placed on the right-hand side of the steering wheel, and the space for placing is very limited due to the rotation of the seat.

In many cases the door post of the bodywork will generally prevent a rotation of the seat, whereby it is often necessary to provide a seat which is not only rotatable but also slidable, for which purpose slide rails also have to be placed. This makes the construction complex and expensive. This means that the rotatable and often slidable seat also has to be provided with means for anchoring the seat. This results in an expensive and unwieldy construction of the seat.

It is now an object of the invention to reduce or even obviate the above stated problems.

SUMMARY OF THE INVENTION

This object is achieved by means of a vehicle, such as a car, camper or van, further comprising:
  a seat, mounted in the vehicle, with a seat surface;
  a carrier arranged close to the seat and mounted in the vehicle, and provided with a drive means for adjusting the carrier between a first position, in which an edge of the carrier runs parallel to the main direction of travel of the vehicle and lies in line with and adjoins the seat surface of the seat, and a second position in which, relative to the first position, this edge of the carrier is arranged at a distance from the seat surface in a direction transversely of the seat surface.

A seat is mounted in the vehicle, preferably on the floor of the vehicle. In the invention a carrier, such as for instance a support beam, is arranged adjacently of the seat and mounted in the vehicle. This carrier is able to bridge a height difference between the first position (the travelling position) and the second position (the entry position). The first and second position can here be the extreme positions. It is possible that the carrier can also be locked at one or more intermediate positions, for instance with a view to being able to easily take up position on the carrier from the seat of the vehicle.

In the first position the carrier lies in line with the seat part of the seat, so that the user can easily take up position on the seat part from the carrier (and vice versa), while in the second position the carrier lies at a height such that the user can easily get out of the vehicle and can optionally move or slide over to an aid such as a wheelchair (and vice versa). In reverse direction, in which the carrier is in the second position, the user will get in at a height such that he or she is situated with his or her backside positioned over the carrier, so that he or she will not slide therefrom during lifting.

The carrier forms a compact and simple solution which can remain present in the vehicle during travel of the vehicle. The carrier does not disrupt the sitting on the seat part, nor does it require the seat being made rotatable and optionally laterally slidable for the purpose of taking up position on the seat part of the seat.

The drive means can be provided in diverse ways here, for instance electrically, hydraulically or by means of an actuator.

The carrier is here constructed such that it can carry the weight of a user and preferably also such that a user, while seated on the carrier, can partially disassemble a wheelchair (for instance remove the wheels) outside of the vehicle with a view to transport with the vehicle.

In a first preferred embodiment of the vehicle according to the invention the edge of the carrier extends in the second position between the seat surface and the floor of the vehicle.

Although the carrier according to the invention can be applied both in vehicles with a lowered and with a raised entrance, it is preferably used according to this preferred embodiment, wherein it bridges a height difference in vehicles with a raised entrance. It is also possible here for the second position of the carrier to lie even lower than the floor, if the dimensions of the vehicle provide possibilities herefor.

In a second preferred embodiment of the vehicle according to the invention the edge is in the second position further arranged at a distance from the seat surface in at least two directions transversely of the main direction of travel of the vehicle.

In this case the carrier will not only move relative to the seat part of the seat in vertical direction but, by means of a lateral movement, also in horizontal direction when adjusted between the first and the second position. This further increases the accessibility of the carrier to a user getting into the vehicle from outside.

In a third preferred embodiment of the vehicle according to the invention the edge of the carrier is arranged for tilting around a shaft running parallel to the edge and at a distance from the edge.

This simplifies the construction of the carrier and the drive means when the carrier is adjusted between the first and the second position by tilting.

In a fourth preferred embodiment of the vehicle according to the invention the distance from the edge to the shaft can be set.

In this way the edge can in the second position for instance be shifted further outward so as to further increase the reachability of the carrier from a position outside the vehicle, while this additional distance is in that case not present when the carrier is folded up in the vehicle in the first position.

In a fifth preferred embodiment of the vehicle according to the invention the carrier is a plank, wherein the outer end of the plank is curved away from the seat in the first position of the seat surface.

It is advantageous to embody the carrier as a partially flat plank, as this provides a comfortable seat part during adjustment. The curved outer end makes it possible to shift a user onto the carrier during adjustment from the second position to the first position, i.e. wherein the distance from the edge to the back of the knee is reduced increasingly further. This simplifies moving to the seat part of the seat of the vehicle.

In a sixth preferred embodiment of the vehicle according to the invention the vehicle further comprises a bodywork with a door opening, wherein in the first position the carrier extends wholly inside the bodywork and wherein the carrier protrudes at least partially out of the bodywork through the door opening.

This makes the carrier easily accessible from the outer side of the vehicle when the carrier is mounted on the vehicle between the door opening and the seat.

In the first position the carrier will not prevent closing of the door of the vehicle in that the carrier extends inside the bodywork. In the second position the carrier lies at least partially outside the bodywork. The carrier is hereby easily accessible in the second position.

In a seventh preferred embodiment of the vehicle according to the invention the seat is the driver's seat of the vehicle.

By arranging the carrier close to the driver's seat the carrier provides possibilities for a driver of a vehicle who has limited mobility to enter this vehicle independently, wherein he or she is less or even not at all dependent on help from third parties. It is however also possible to additionally or exclusively provide a separate carrier for one or more of the possible other seats.

In an eighth preferred embodiment of the vehicle according to the invention the seat comprises a box on which the seat surface is arranged, which box is mounted on the floor of the vehicle, wherein the drive means comprises a winch.

A drive means which functions by means of a winch has advantages relative to other, above stated types of drive means which are optionally also possible. The overall space required is relatively limited, and such a drive means can be easily arranged on the seat, for instance on the side opposite the side where the carrier is mounted. This is advantageous, among other reasons, with a view to the electronics arranged in the box.

In a ninth preferred embodiment of the vehicle according to the invention the drive means is connected to a remote control for controlling the drive means.

In order to prevent being dependent for the control it is recommended for the drive means to be provided with a remote control for adjusting the carrier between the first and the second position. This remote control can be a separate remote control but can optionally also be integrated into the dashboard of the vehicle, or for instance be operable via a mobile telephone such as a smart phone.

In a tenth preferred embodiment of the vehicle according to the invention the seat is mounted non-rotatably on the floor of the vehicle.

Because of the chosen construction of the carrier it is no longer necessary but merely optional to provide a rotation option of the seat. For this reason the seat can be fixedly mounted on the vehicle in non-rotatable manner, which further increases the safety of the seat.

In an eleventh preferred embodiment of the vehicle according to the invention the vehicle comprises a loading space, wherein the vehicle is further provided with a remotely controllable bracket for lifting a wheelchair into the loading space.

A user having limited mobility will often make use of a wheelchair to move outside and to the vehicle. In order to enable the wheelchair to be stored in the vehicle after the user has entered the vehicle, it is recommended to provide the vehicle with a preferably electronically controlled bracket whereby the wheelchair can be lifted into the loading space. Trunk hoists and ceiling lifts suitable for this function are per se known.

The invention further relates to a carrier with a drive means, this carrier being suitable for arranging close to a seat in a vehicle, adjustable between a first position and a second position, wherein relative to the first position an edge of the carrier is arranged at a distance from the first position, wherein the drive means is suitable for adjusting the carrier between the first and the second position.

The carrier according to the invention can preferably be placed in a vehicle in the above described manner and, where applicable to the carrier, the preferred embodiments of the vehicle can for similar reasons also be advantageously applied to the carrier.

BRIEF DESCRIPTION OF THE DRAWINGS

These and other features of the invention are further elucidated with reference to the accompanying drawings.

DESCRIPTION OF THE INVENTION

Figure 1A:
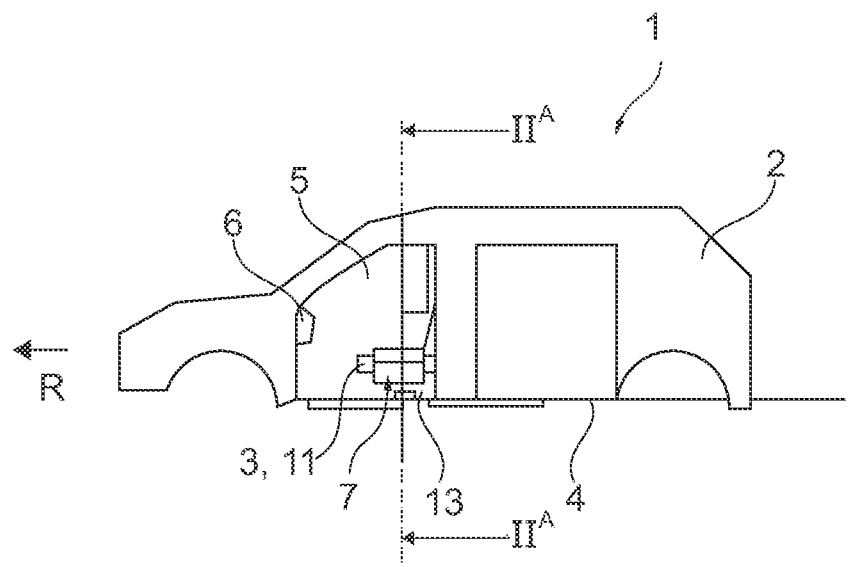
FIGS. 1A and 1B show a side view of a vehicle according to the invention with the support beam in respectively the first and second position.
Figure 1B:
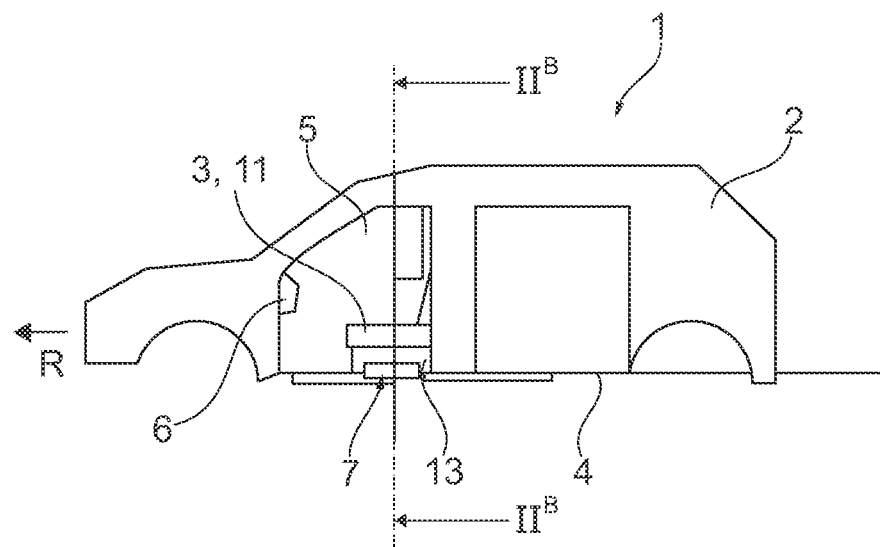

FIGS. 1A, 1B, 2A, and 2B show a vehicle 1 with a bodywork 2. In bodywork 2 a driver's seat 3 is mounted on the floor 4 of bodywork 2 close to a door opening 5 in bodywork 2. The driver's seat is directed toward dashboard 6 of vehicle 1. A carrier 7 is arranged between door opening 5 and driver's seat 3.

Carrier 7 comprises a plank 8 with an edge 9 running parallel to the main direction of travel R of the vehicle. The carrier also comprises an outer end 10 which in the first position is curved away from seat surface 11. Carrier 7 is mounted for tilting around shaft 12, which shaft 12 likewise runs parallel to the main direction of travel R of vehicle 1.

Figure 2A:
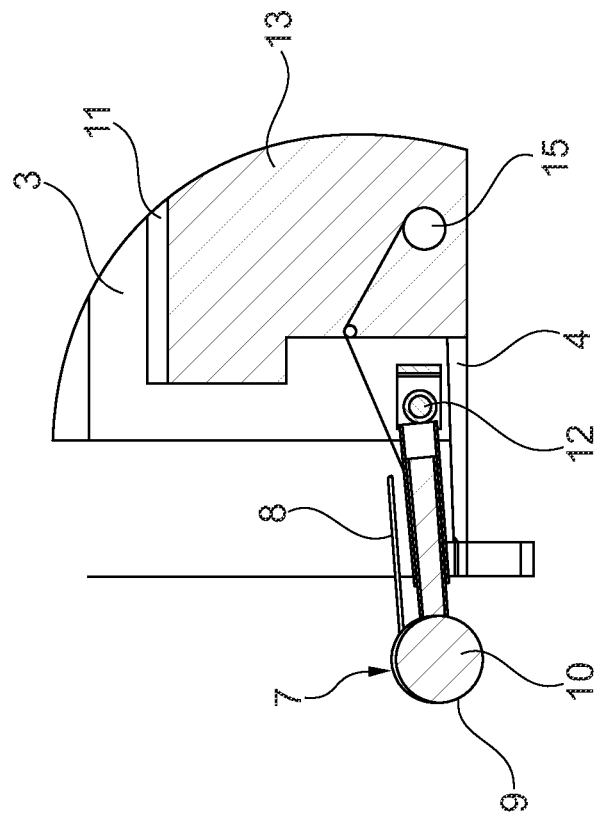
FIGS. 2A and 2B show a detail in rear view along the lines II-II (respectively A and B) in FIGS. 1A and 1B in respectively the first and second position.
Figure 2B:
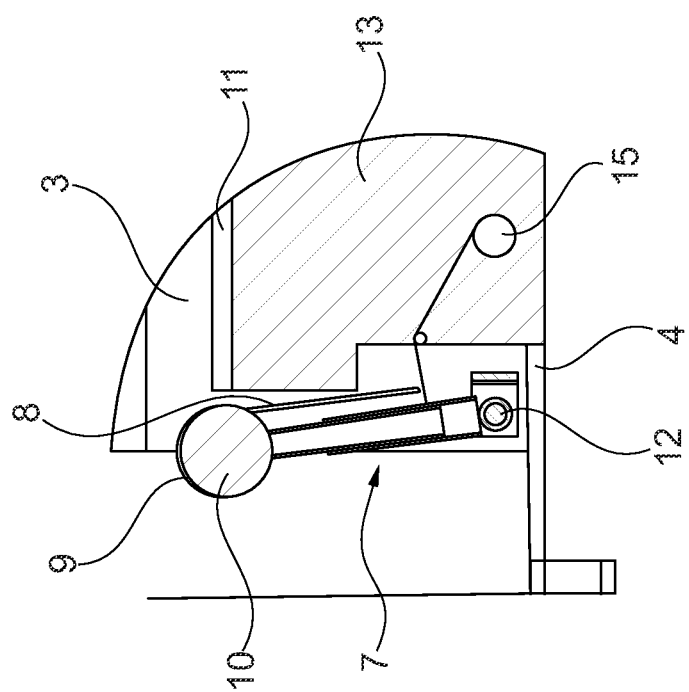
Figure 2C:
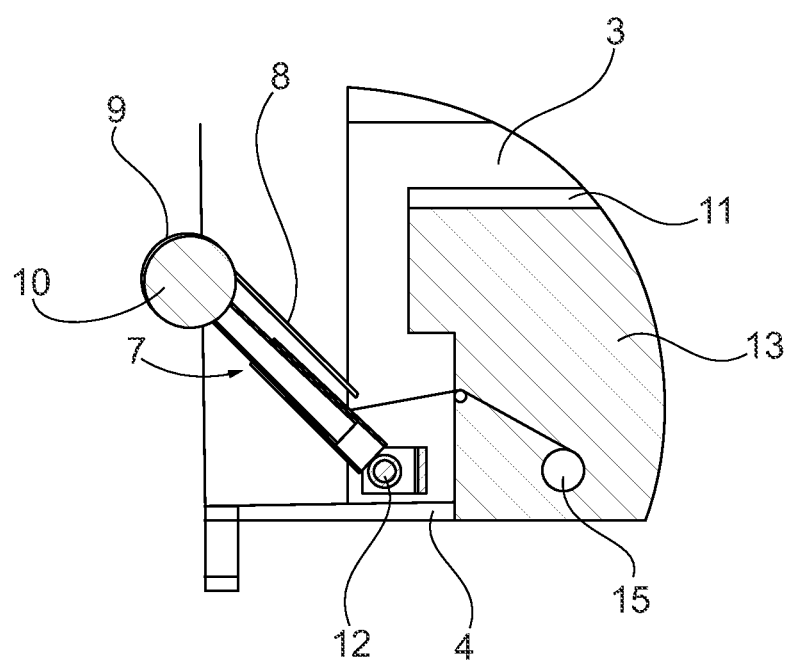
FIG. 2C shows a detail in rear view along lines II-II in FIG. 1A, but with the edge of the carrier extending in a third position between the first position and the second position.

In the first position carrier 7 lies here in line with seat surface 11 of driver's seat 3, which seat surface 11 is mounted on floor 4 of vehicle 1 by means of a box 13. A drive adjusts the carrier 7 between the first position (FIG. 2A), the second position (FIG. 2B), and the third position (FIG. 2C). A winch 15, which is one embodiment of a drive, runs between seat surface 11 and box 13. In the second position carrier 7 protrudes out through door opening 5.

The distance from outer end 10 to shaft 12 is variable in that outer end 10 and plank 8 can be extended relative to shaft 12 via a telescopic mechanism.

The invention claimed is:
1. A vehicle, such as a car, camper or van, further comprising:
   a seat, mounted in the vehicle, with a seat surface;
   a carrier arranged close to the seat and mounted in the vehicle, and provided with a drive for adjusting the carrier between a first position, in which an edge of the carrier runs parallel to the main direction of travel of the vehicle and lies in line with and adjoins the seat surface of the seat, and a second position in which, relative to the first position, this edge of the carrier is arranged at a distance from the seat surface in a direction transversely of the seat surface, wherein the edge of the carrier extends in the second position to the floor of the vehicle and wherein the edge of the carrier extends in a third position between the first position and the second position.
2. The vehicle as claimed in claim 1, wherein the edge is in the second position further arranged at a distance from the seat surface in at least two directions transversely of the main direction of travel of the vehicle.
3. The vehicle as claimed in claim 1, wherein the edge of the carrier is arranged for tilting around a shaft running parallel to the edge and at a distance from the edge.
4. The vehicle as claimed in claim 3, wherein the distance from the edge to the shaft can be set.
5. The vehicle as claimed in claim 3, wherein the carrier is a plank, wherein the outer end of the plank is curved away from the seat in the first position of the seat surface.
6. The vehicle as claimed in claim 1, further comprising a bodywork with a door opening, wherein in the first position the carrier extends wholly inside the bodywork and wherein in the second position the carrier protrudes at least partially out of the bodywork through the door opening.
7. The vehicle as claimed in claim 1, wherein the seat is the driver's seat of the vehicle.
8. The vehicle as claimed in claim 1, wherein the seat comprises a box on which the seat surface is arranged, which box is mounted on the floor of the vehicle, wherein the drive comprises a winch.
9. The vehicle as claimed in claim 1, wherein the drive is connected to a remote control for controlling the drive.
10. The vehicle as claimed in claim 1, wherein the seat is mounted non-rotatably on the floor of the vehicle.
11. A carrier with a drive, this carrier being suitable for arranging close to a seat in a vehicle, adjustable between a first position and a second position, wherein relative to the first position an edge of the carrier is arranged at a distance from the first position, wherein the drive is suitable for adjusting the carrier between the first and the second position and for adjusting the carrier to a third position between the first position and the second position, wherein in the second position the edge of the carrier extends to the floor of the vehicles.
12. The carrier as claimed in claim 1, wherein the edge of the carrier extends in the second position below the floor of the vehicle.

* * * * *